(No Model.)
W. MACKINTOSH.
Distributing the Wires of Underground Telegraphs.
No. 228,658. Patented June 8, 1880.
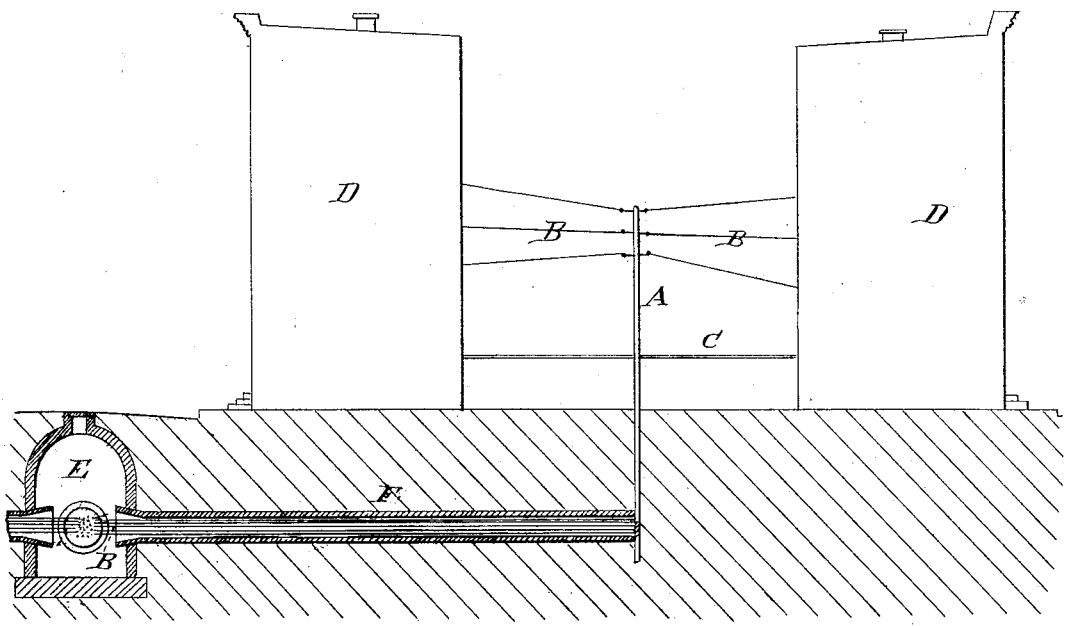
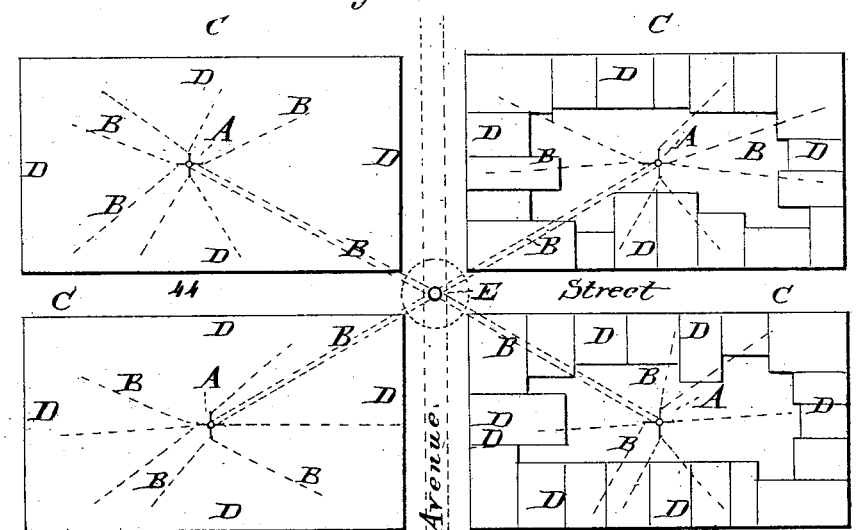

UNITED STATES PATENT OFFICE.

WILLIAM MACKINTOSH, OF NEW YORK, N. Y.

DISTRIBUTING THE WIRES OF UNDERGROUND TELEGRAPHS.

SPECIFICATION forming part of Letters Patent No. 228,658, dated June 8, 1880.

Application filed April 14, 1880. (No model.)

*To all whom it may concern:*

Be it known that I, WILLIAM MACKINTOSH, of the city, county, and State of New York, have invented a new and Improved Method of Leading Telegraph-Wires into Buildings from Underground Wires and Cables, of which the following is a specification.

This invention relates to the leading of telegraph-wires into buildings in such a manner that the wires cannot be seen from the street.

The invention is an improvement upon patents for underground-telegraph lines that were granted to me January 20, 1874, and January 16, 1877, and numbered 146,695 and 186,355, respectively; and it consists in leading telegraph wires or cable through suitable underground tubes or conduits to a pole or other device erected within the square inclosed by blocks of houses, and in leading the said wires from said pole into the rears of said houses.

Figure 1 is an elevation representing a telegraph-pole, blocks of houses, and their connecting-wires, and showing in section an elevation of an underground conduit and vault, with telegraph wires or cable arranged therein and connected with the telegraph-pole. Fig. 2 is a plan representing the manner in which the system is applied.

Similar letters of reference indicate corresponding parts.

In the drawings, the telegraph-pole A, that supports the wires B, is set in the middle of the inclosed square C, that is formed by the buildings D D.

E represents an underground vault, and F an underground conduit or tube, through which the wires B pass to the pole A, and thence to the rears of the buildings D D through the windows, doorways, walls, or roofs thereof, as may be most convenient.

A tower, a grooved or hollow pole, or other suitable device may be used in lieu of the ordinary telegraph-pole, herein shown.

In cases where a telegraph-pole cannot conveniently be placed in the inclosed square on account of back buildings or other obstructions, the telegraph-cable from the underground conduit or vault is conducted through a pipe up the rear side of one of the buildings to a fixture on its roof, and the wires spread thence to the other buildings inclosing the square.

I claim for my system of leading telegraph-wires into buildings the following advantages:

First, it avoids the use of poles in the street.

Secondly, the unsightly appearance of wires entering the front of buildings is avoided.

Thirdly, the danger and annoyance occasioned in the streets by the breaking and repairing of wires is entirely obviated.

Fourthly, it allows the wires to radiate to all the houses of a square without crossing each other.

Fifthly, it gives a practically equal length of wire for all of the houses of the square, securing uniform resistance for each.

Sixthly, the walled inclosure of houses serves as a protection for the poles and wires.

Seventhly, it simplifies the laying of the wires.

Eighthly, it brings all the wires together where they can be collectively inspected.

Having thus described my invention, I claim as new and desire to secure by Letters Patent—

A system of telegraph lines or circuit composed of main lines laid beneath the surface of the street, branch lines running to a centrally-located point in the hollow square of the city, and the radiating lines from the central point to the several houses of each square, substantially as herein shown and described.

WM. MACKINTOSH.

Witnesses:
I. I. STORER,
JAMES H. HUNTER.